(12) United States Patent
Martin et al.

(10) Patent No.: US 6,412,016 B1
(45) Date of Patent: Jun. 25, 2002

(54) NETWORK LINK BYPASS DEVICE

(75) Inventors: Jean-Christophe Martin, Varces; Steve McKinty, Theys, both of (FR)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/288,419

(22) Filed: Apr. 8, 1999

(30) Foreign Application Priority Data

Apr. 10, 1998 (EP) .............................................. 98410037

(51) Int. Cl.[7] .............................................. G06F 13/00
(52) U.S. Cl. ........................ 709/250; 709/238; 709/313
(58) Field of Search ................................ 709/217, 218, 709/238, 250, 313, 249

(56) References Cited

U.S. PATENT DOCUMENTS

| 4,594,724 A | * | 6/1986 | Hogan ......................... 375/219 |
| 5,317,198 A | | 5/1994 | Husbands |
| 5,677,838 A | | 10/1997 | Itou et al. |
| 6,038,044 A | * | 3/2000 | Fee et al. .................... 359/119 |
| 6,038,618 A | * | 3/2000 | Beer et al. ..................... 710/18 |
| 6,122,753 A | * | 9/2000 | Masuo et al. .................. 714/4 |

FOREIGN PATENT DOCUMENTS

EP 0 397 196 11/1990

OTHER PUBLICATIONS

Patent Abstracts of Japan, Publication No. 10051479, Publication Date: Feb. 20, 1998.

* cited by examiner

*Primary Examiner*—Viet D. Vu
(74) *Attorney, Agent, or Firm*—Conley, Rose & Tayon, PC; B. Noël Kivlin

(57) ABSTRACT

For bypassing a computer system coupled between first and second network links, the computer system executes a software which provides a predetermined control signal on a control line. The control line is polled by a bypass device that will cause the computer system to be bypassed when said control signal is not present on the control line. The control signal may be in the form of periodic pulses and a bypassing is caused when a pulse is not received on the control line within a predetermined period of time.

10 Claims, 2 Drawing Sheets

NETWORK LINK BYPASS DEVICE

FIELD OF THE INVENTION

The present invention relates to a device for bypassing a computer system interconnecting two network links when this computer system fails.

DISCUSSION OF THE RELATED ART

It is often desirable to insert, between two systems interconnected through a network link, a transparent control system for various possible purposes. The control system may be used for restricting access, for event logging, for ciphering and deciphering.

FIG. 1 schematically shows an arrangement providing this functionality. A system A normally communicates with a system B over a network link, such as an Ethernet link. A control system C is inserted in the network link between systems A and B. In other words, system A is coupled to a network interface card 10 of system C through a network link ethA, while system B is coupled to a second network interface card 11 of system C through a network link ethB.

System C, usually a work station, is supposed to be transparent for systems A and B as regards the network frames exchanged between them. For this purpose, system C executes software which copies the frames between links ethA and ethB. In fact, it mainly operates as a hub. In some case, however, the software may analyze the frames or even perform operations thereon.

Of course, system C is subject to failure. In case of failure, it is desirable to maintain the link between system A and system B. For this purpose, it is known to use bypass devices which are capable of detecting a hardware failure, for example by achieving CRC checks on the frames, in order to switch the network links to bypass links.

However, such devices are not able to detect a software failure, such as an abnormal program termination or a system hang. Indeed, in this case, the frames do not have errors, they are simply not copied from one link to the other.

SUMMARY OF THE INVENTION

An object of the present invention is to provide a bypass device capable of achieving its function in case of a software failure of a control system.

This object and others are achieved by executing on the transparent system a software which provides a predetermined control signal on a control line. The control line is polled by the bypass device. The bypass device will bypass the transparent system when the control signal is not present on the control line.

According to a preferred embodiment of the invention, the control signal is in the form of periodic pulses and a bypassing is caused when a pulse is not received on the control line within a predetermined period of time.

The bypass device includes a switch having a first position selecting a main path between first and second network links, including the transparent system, and a second position selecting a bypass path between the first and second network links. A control circuit selects the first position of the switch when the control signal is received on the control line, and selects the second position of the switch when the control signal is not received on the control line.

The foregoing and other objects, features, aspects and advantages of the invention will become apparent from the following detailed description of embodiments, given by way of illustration and not of limitation with reference to the accompanying drawings.

DETAILED DESCRIPTION OF THE PREFERRED EMBODIMENTS

Figure 1:
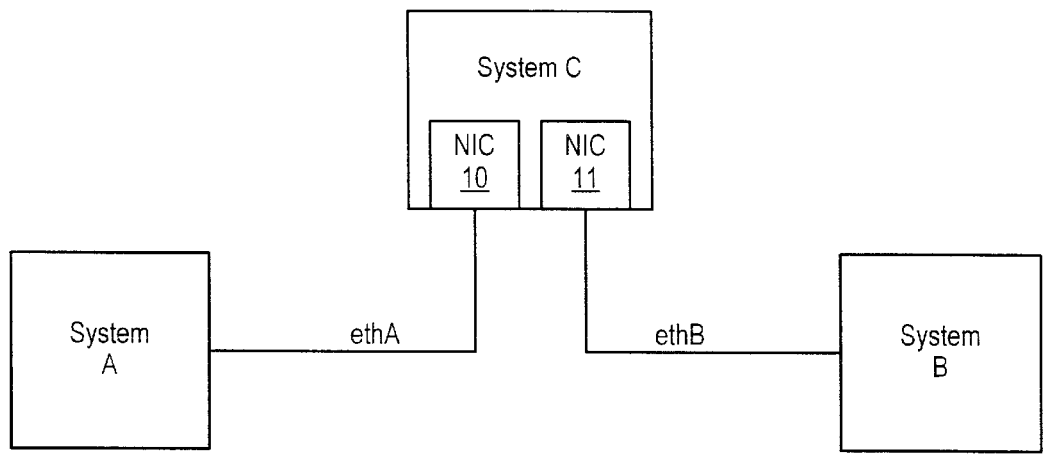
FIG. 1, previously described, shows a conventional arrangement including a transparent control system inserted in a network link.

A network bypass device according to the invention is intended to reestablish the network link between system A and B of FIG. 1 in case of a software failure in transparent control system C.

Figure 2:
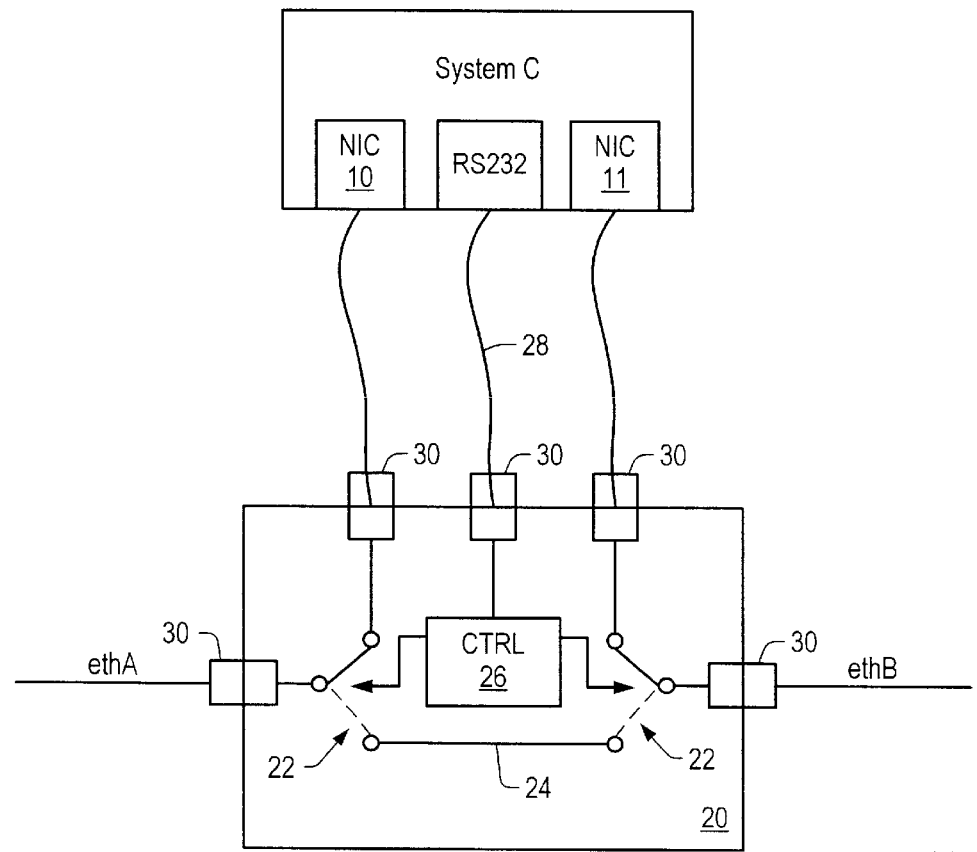
FIG. 2 shows an embodiment of a network bypass device according to the invention.

FIG. 2 schematically shows an embodiment of such a device. The device 20 is connected between control system C and the two network links ethA and ethB. It includes a double switch 22 which, in a first and normal position, connects network link ethA to network interface card 10 of system C and connects network link ethB to network interface card 11 of system C. Thus, in its normal position, switch 22 connects system C to the network links ethA and ethB exactly as in FIG. 1.

In a second, bypass position, shown in dotted lines, switch 22 connects network links ethA and ethB directly the one to the other through a link 24.

Switch 22 is operated by a control circuit 26 which is coupled to system C through a control line 28.

The software executed by system C is adapted to provide a specific control signal on line 28, As long as this control signal is present on line 28, control circuit 26 selects the normal position of switch 22, so that the traffic on links ethA and ethB normally passes through system C.

In the case of a software failure, the software is no longer capable of providing the control signal on line 28. Control circuit 26 detects the absence of the control signal and, as a consequence, selects the bypass position of switch 22, directly interconnecting links ethA and ethB through link 24.

The control signal generated by the software on line 28 is, for example, in the form of periodic pulses. Control circuit 26 then includes a timer which restarts counting down a time-out period at each arrival of a pulses. If a pulse does not arrive because of a software failure, the timer reaches the time-out period and selects the bypass position of switch 22.

Of course, if the hardware of system C fails, the software will also fail in many cases, whereby the device according to the invention will also perform its bypass function.

In a preferred embodiment, as shown, the bypass device 20 is external to system C. Device 20 is then included in a housing provided with standard connectors 30 which directly receives the network links ethA and ethB and enable system C to be coupled to device 20 through standard cables. Control line 28 is then any externally available standard link, such as a serial RS232 link, as shown. It is particularly simple to send any specific signal on a standard serial link by software.

An RS232 link has the additional advantage of providing supply voltages, which may be used for powering the bypass device 20. However, an independent powering of the bypass device will allow the device to continue operating even if system C has a power failure.

Figure 3:
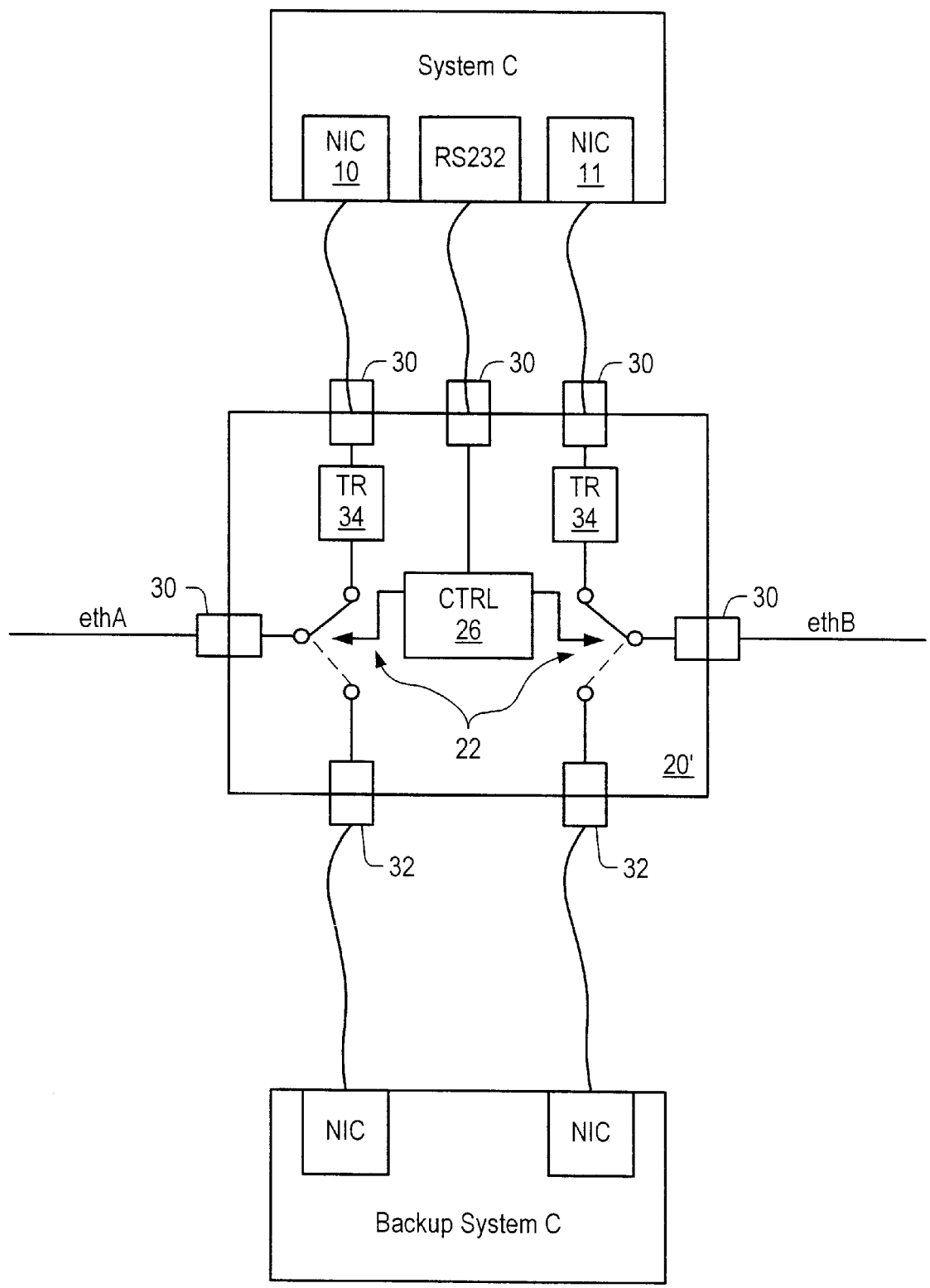
FIG. 3 shows another embodiment of a network bypass device according to the invention.

FIG. 3 shows another embodiment of a network bypass device according to the invention, here designated by 20'. In FIG. 3, same elements as those in FIG. 2 are designated with same reference characters.

One difference of this embodiment with respect to that of FIG. 2 is that the direct bypass link 24 of FIG. 2 is replaced by two connectors 32 which are respectively internally connected to links ethA and ethB through switch 22 when it is in its bypass position (dotted lines).

Each of connectors 32 is intended to be coupled to a respective network interface card of a second, backup system C which performs the same functions as system C.

With this arrangement, when main system C fails, bypass device 20' interconnects network links ethA and ethB through backup system C. This embodiment is particularly useful if system C performs important security functions.

Of course backup system C may be replaced by a direct external link between connectors 32, whereby the device will operate as that of FIG. 2.

In some cases, network interface cards are connected to their respective links through transceivers which adapt the physical interface of the network cards to the characteristics of the network links. A bypass device according to the invention, as shown in FIG. 3, may advantageously include such transceivers. As shown, the transceivers 34 are inserted between switch 22 and respective connectors 30.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A device for interconnecting a first network link, a second network link and a computer system that transfers information between the first and second network links under the control of software executed by the computer system, characterized in that it includes:

a switch having a first position selecting a main path between the first and second network links, including said computer system, and a second position selecting a bypass path between the first and second network links; and a control circuit for selecting the first position of the switch when a predetermined control signal is received on a control line coupled to said computer system, and for selecting the second position of the switch when the predetermined control signal is not received on the control line;

wherein said predetermined control signal is in the form of periodic pulses, the control circuit being arranged to select the second position of the switch when a pulse of the control signal has not been received within a predetermined period of time.

2. The device of claim 1, wherein said software is adapted to provide the predetermined control signal on the control line.

3. The device of claim 1, wherein the control line is a standard serial link between the device and the computer system.

4. The device of claim 1, wherein said bypass path includes a direct link.

5. The device of claim 1, wherein said bypass path includes a backup computer system.

6. The device of claim 1, included in an external housing and comprising:

first and second connectors for respective connection to the first and second network links;

third and fourth connectors in said main path for respective connection to two network interface cards of the computer system; and a fifth connector for connection of the control line.

7. The device of claim 6, comprising sixth and seventh connectors in said bypass path for respective connection to two network interface cards of a backup computer system.

8. The device of claim 6, wherein said main path includes a transceiver connected to each of the third and fourth connectors inside said housing.

9. A method for bypassing a computer system coupled between first and second network links, characterized in that it includes the steps of:

executing in said computer system a software which provides a predetermined control signal on a control line, wherein said control signal is in the form of periodic pulses;

polling the control line; and bypassing the computer system when said control signal is not present on the control line.

10. The method of claim 9, wherein the step of polling includes expecting a pulse on the control line within a predetermined period of time.

* * * * *